United States Patent [19]
Favre

[11] Patent Number: 5,675,900
[45] Date of Patent: Oct. 14, 1997

[54] SAW BLADE-HOLDER

[75] Inventor: Roger Favre, Vallorbe, Switzerland

[73] Assignee: Scies Miniatures S.A., Switzerland

[21] Appl. No.: 697,584

[22] Filed: Aug. 27, 1996

[30] Foreign Application Priority Data

Sep. 11, 1995 [CH] Switzerland ............ 2 565/95-1

[51] Int. Cl.$^6$ .................... B23D 51/14; B23D 49/11
[52] U.S. Cl. ....................... 30/509; 30/508; 30/507
[58] Field of Search ................. 30/506, 507, 508, 30/509, 517, 518, 523, 524

[56] References Cited

U.S. PATENT DOCUMENTS

| | | | |
|---|---|---|---|
| 177,659 | 5/1876 | Pratt | 30/509 |
| 686,227 | 11/1901 | Jones | 30/509 |
| 948,151 | 2/1910 | Ullrich | 30/507 |
| 1,988,949 | 1/1935 | Kelley | 30/509 |
| 2,183,669 | 12/1939 | Chucto . | |
| 5,303,478 | 4/1994 | Gugel | 30/507 |

FOREIGN PATENT DOCUMENTS

| | | |
|---|---|---|
| 1255653 | 6/1961 | France . |
| 621217 | 11/1935 | Germany ............... 30/523 |
| 32 48 584 A1 | 7/1984 | Germany . |

OTHER PUBLICATIONS

Search Report No. CH 256595 dated May 9, 1996.

*Primary Examiner*—Hwei-Siu Payer
*Attorney, Agent, or Firm*—Kane, Dalsimer, Sullivan, Kurucz, Levy, Eisele and Richard, LLP

[57] ABSTRACT

It comprises a U-shaped bow (1), a handle (2) and two securing devices (3, 4) at both ends of the saw (5), each of the devices (3, 4) comprising a body (31) fitted with a longitudinal passage (32) enabling the control and centering of the saw (5), the body (31) comprising a tightening screw (33, 34) fitted perpendicularly to the passage (32) enabling the possibility of tightening the corresponding end of the afore-mentioned saw (5) in the passage (32).

5 Claims, 1 Drawing Sheet

1

SAW BLADE-HOLDER

FIELD OF THE INVENTION

This invention concerns a saw blade-holder comprising a U-shaped bow, a handle and two securing devices at the two ends of the saw.

PRIOR ART

These devices are commonly used for securing wire-shaped or low-width flat blades of saws used for sawing different materials. Normally the blade or the wire is secured to the ends between two solid jaws at either end of the bow. The jaws comprise, in the main, on the one hand, a fixed solid pan at either end of the bow and, on the other hand, a second moving part which is a plate through which a screw is screwed on to the fixed part. By turning the screw in one direction, the moving plate is secured to the flat surface and therefore the blade is secured.

This method, which has been used for decades, has the disadvantage of uncertain securing and inaccurate positioning and often, during the tightening of the plate, the saw gets twisted or, during sawing, it becomes deformed.

SUMMARY OF THE INVENTION

The aim of this invention is to offer a saw blade-holder for these saws and, more specifically, for saws used by jewellers which are smaller in size, regardless of whether they are flat or wire-shaped.

The saw blade-holder in this invention is characterised by the fact that the two securing devices are identical, that each of the said devices comprises a body fitted with a longitudinal passage, the dimensions of the cross-section of which correspond to the cross-section of the saw enabling the control and centring of the saw and that the afore-mentioned body comprises a securing screw fitted perpendicularly to the said passage enabling the tightening of the end corresponding to the afore-mentioned saw on the passage.

The advantage of the saw blade-holder in this invention is the fact that the saw blade is controlled and centred in the passage of the said block, the dimensions of which clearly correspond to the normal dimensions of these saws and, during sawing operations, there is practically no room for the saw to become displaced within the afore-mentioned passage.

In accordance with the operational variations, the tightening is effected between the ends of two screws, one on the passage side and the other used for tightening or loosening the blade. As such, this also enables the saw to be modified for left and right-hand users. In fact, when the blade is fitted, it is essential to ensure that the blade is tightly secured between the two ends of the bow and, to this end, the bow is pushed, using the hand or the abdomen, against an obstacle, the screw then being tightened or loosened. Depending upon whether the user is left or right-handed, the tightening and loosening screw must be on the correct side and, in this case, it is simply sufficient to change over the position of the fixed screw with the tightening screw fitted with a toothed wheel. This modification can be made very easily by future users where it is also possible, during assembly, to provide for saw blade-holders for left or right-handed users, without having to provide for any special construction.

In accordance with another operational variation and in order also to enable the possibility of slightly moving the saw outside the plane of the bow, thus allowing the piece being worked upon to be seen, the securing device comprises a T-piece, the head of the T being perpendicular to the plane of the bow and the afore-mentioned body is fitted to the right or left-hand side of the leg of the T depending upon the user hand of the operator. The securing is effected through a screw which crosses the leg of the T-piece and ends up inside the passage. This screw and the screws with toothed wheels ensure that the blade is secured. By assembling the body on one side or the other at the outset, we have a saw for a left or right-handed user. The operational variation also enables the possibility of using a saw the length of which is greater than the distance between the ends of the bow.

The invention also seeks to offer a saw blade-holder which allows the easy replacement of faulty or worn parts. Each of the parts of the bow, securing devices and handle are therefore interchangeable.

In order to contribute to the lightness of the tool, the bow is constructed from a crushed pipe which represents sufficient resistance for work carried out by jewellers and that of a similar nature.

Likewise, the handle is constructed from a foam-covered plastic material, enabling the possibility of avoiding the tool slipping when the user sweats.

BRIEF DESCRIPTION OF THE DRAWINGS

The invention will be described in further detail with the aid of the drawing in the annex.

DESCRIPTION OF THE PREFERRED EMBODIMENT(S)

Figure 1:
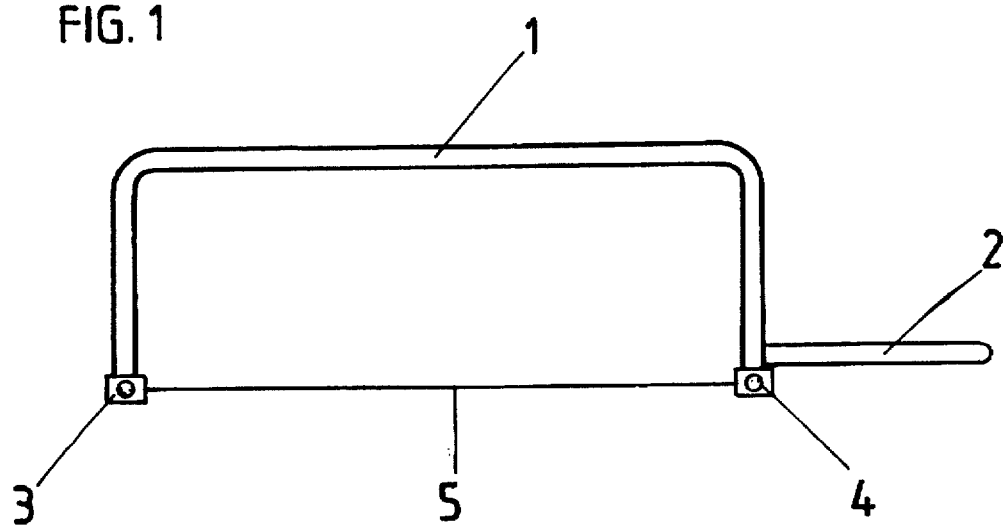
FIG. 1 is a diagrammatic side-view of the tool showing the different elements.

FIG. 1 shows a U-shaped bow 1 fitted with a handle 2 and two securing devices 3 and 4 for a blade 5. The afore-mentioned 5 elements are preferably interchangeable and thus detachable. For example, screws or similar assembly devices are used in order to interconnect these different elements.

Figure 2:
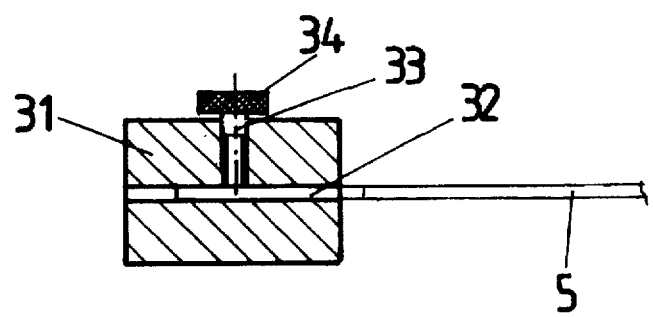
FIGS. 2, 3 and 4 are horizontal sections of the securing device at the ends of the saw.

FIG. 2 shows the simplest variant for the securing device. This device comprises a body 31 fitted with a longitudinal passage 32, the dimensions of which correspond to the dimensions of the blade 5 thus enabling the blade to be controlled and centred. A screw 33, fitted with a toothed-wheel head 34 enables the possibility, once the blade 5 is refitted into the passage 32, of tightening the blade against the wall of the passage 32 and thus securing the blade. Devices 3 and 4 are identical.

Figure 3:
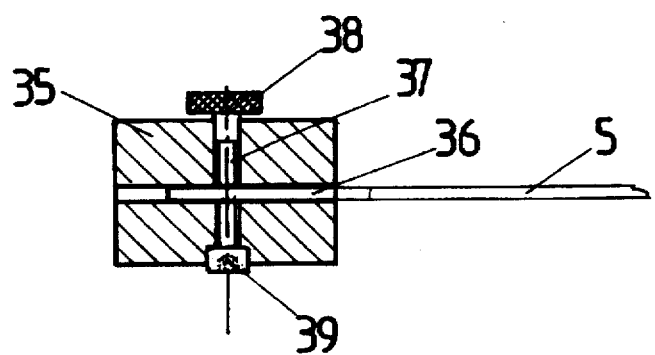

FIG. 3 shows another operational variant comprising a body 35 also crossed by the passage 36 and fitted with a screw 37 with a toothed-wheel head 38. In relation to body 31, body 35 is fitted with another screw 39 located on the extension of screw 37. This screw has a dual purpose: the first is to be able to ensure the securing of the blade 5 between the ends of the screws 37 and 39 which may be hardened thus allowing for correct tightening and, at the same time, enabling the body 35 to be constructed from a light alloy which is an advantage for the saw blade-holder. A second advantage is that the screws 39 and 37 can be adjusted to customise the saw for a left or right-handed user.

Figure 4:
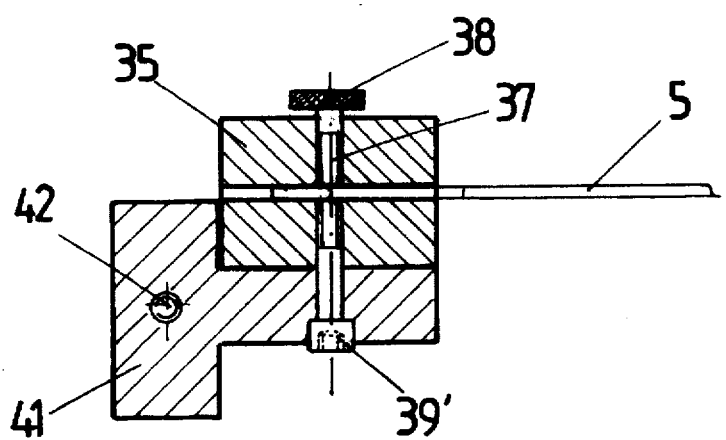

Finally, the securing device in FIG. 4 comprises a body 35 which is identical, or almost identical, to the one in FIG. 3, fitted with a screw 37, driven by a tooth-wheel head 38. The piece 41 is in the shape of a T and the body 35 is fitted to the side of the leg of the afore-mentioned piece with a screw 39' which is longer than screw 39. This screw 39' ensures the securing of the body 35 on to this intermediary piece 41 and also ensures, as in FIG. 4, the securing of the saw blade between the two ends of screws 37 and 39'. In this case, piece 41 is fitted so that the leg of piece 41 is located in the same plane as the bow 1 which means that the blade 5 is off-centre in relation to the plane of the bow, a possible advantage when working on small pieces because the working plane is completely clear from the point of view of visibility.

On the other hand, this construction also enables the possibility of fitting the body 35 to the left or right-hand side of piece 41, thus converting the saw for right or left-handed users. Piece 41, as, moreover, with pieces 35 in FIG. 3 and 31 in FIG. 2, is fixed on to the bow, for example, using a screw 42 which is only shown in FIG. 4. In addition, this off-centre position enables the possible use of a saw which is greater in length than the distance from one end of the bow, this length usually being 130 mm.

The saw blade-holder is fitted with a handle 2, which is also interchangeable, fitted using a screw or equivalent device made from a foam-covered cylindrical piece, enabling the correct behaviour of the saw blade-holder.

The elements described above constitute operational variants and other operational variants may be envisaged.

I claim:

1. Saw blade-holder for holding a saw comprising a U-shaped bow having two ends, a handle and two securing devices at the two ends of the bow, each of the two devices being joined to one of the ends of the bow, characterised by the fact that the two securing devices are identical, that each of the said devices comprises a body fitted with a longitudinal passage, the dimensions of the cross-section of which correspond to the cross-section of the saw enabling the control and centering of the saw and that the afore-mentioned body comprises a first securing screw fitted perpendicularly to the said passage enabling the tightening of the corresponding end of the afore-mentioned saw in the passage, said body being fitted by a second screw on the leg of a T-shaped piece, the head of the T being perpendicular to the plane of the bow and the second screw being located on the extension of the first securing screw.

2. Saw blade holder according to claim 1, characterised by the fact that the said securing devices are constructed from light alloy and the screws have hardened ends.

3. Saw blade-holder according to claim 1, characterised by the fact that each of the pieces which comprise the saw blade-holder are interchangeable.

4. Saw blade-holder according to claim 1, characterised by the fact that the bow is constructed from a crushed pipe.

5. Saw blade-holder according to claim 1, characterised by the fact that the handle is made of a foam-covered plastic material.

* * * * *